Figure 1:
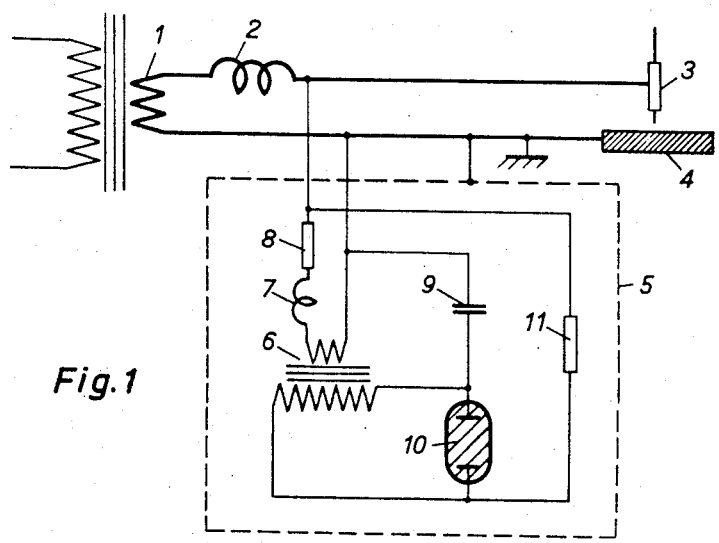

United States Patent Office 2,880,376
Patented Mar. 31, 1959

2,880,376

APPARATUS FOR STABILIZING THE WELDING ARC IN AN ELECTRIC ARC-WELDING INSTALLATION

Franz Tajbl, near Munich, and Max Gillitzer, Munich, Germany, assignors to Gesellschaft für Linde's Eismaschinen Aktiengesellschaft, Hollriegelskreuth, near Munich, Germany, a German company Application February 18, 1957, Serial No. 640,904

Claims priority, application Germany February 25, 1956

8 Claims. (Cl. 315—289)

This invention relates to apparatus for stabilising the welding arc in an electric arc-welding installation.

In alternating-current arc welding, in which an electric arc is struck and maintained between an electrode and a workpiece to be welded, the electrode and the workpiece are at different temperatures during the welding operation and in addition may consist of different materials. Therefore current is conducted through the path of the arc more readily in one direction than in the other so that the welding current is partially rectified in the arc, that is to say it is partially suppressed in one direction or the other. The arc is always likely to be extinguished when the alternating current ceases to flow in the more readily conductive direction. The arc can, however, be stabilised by high-frequency discharges and it has become known to superimpose upon the welding current a high-frequency high-voltage alternating-current at about $10^3$ kilocycles per second and 2000 v. The path of the arc is ionised by high-frequency discharges in order that an arc may be struck in either direction.

The high-frequency discharges have a pronounced disturbing effect on wireless reception. Moreover, it is very difficult and almost impossible to withhold high-frequency oscillations from the main energy supply system of the welding installation with the result that the supply network is adversely affected. It has therefore already been proposed to superimpose upon the welding current high-frequency oscillations which are free from harmonics and which are generated in electron tube transmitters. Such arrangements are too susceptible to break-down and are also costly. Since oscillations generated in this manner are purely sinusoidal, relatively high outputs of some several hundred volt-amperes must be employed. This increases the danger of burning of the hands of the welder.

For stabilising a welding arc, it has already been found sufficient to discharge a condenser suddenly through the arc path, i.e. between the electrode and the workpiece, only at the beginning of the alternating-current half-cycles in which the current does not readily flow. Wireless disturbance is then negligibly small. In a known apparatus, a condenser is charged with direct-current to a few hundred volts, and discharged through a grid-controlled gas-filled thyratron precisely at the instant of commencement of each partially suppressed half-cycle of the alternating welding current. The thyratron is fired by a voltage impulse supplied by a triode, the grid voltage of which is proportional to the momentary welding voltage.

Quite apart from the fact that the thyratron is sensitive and has only a short useful life by reason of the high load, this apparatus has the disadvantage that the current impulse can only be superimposed on the alternating current in one direction, because the thyratron is a rectifier. Moreover, a separate direct-current source is necessary for charging the condenser. However, it is frequently desirable to feed a current impulse to the arc at the commencement of both positive and negative half-cycles. This will be explained by way of example as applied to the welding of aluminium with a tungsten electrode under a protective argon atmosphere. As long as the tungsten is cold, that is at the beginning of the welding operation, the aluminium emits electrons more readily than the tungsten so that the arc current is suppressed in that half-cycle in which the tungsten is the cathode. However, when the tungsten electrode is hot it is more emissive than the aluminium, so that the other half-cycle, in which the aluminium is the cathode, exhibits the lower arc conductivity.

According to the invention there is provided in an electric arc-welding installation, apparatus for stabilising the welding arc, comprising an impulse transformer, a condenser and a circuit element having the property that its resistance suddenly falls from a high value to a low value as the voltage across it is raised to and beyond a critical value, the primary winding of the transformer being connected for energisation by alternating current produced by an alternating voltage, for example the welding voltage in the case of an alternating-current arc-welding installation, and the secondary winding being so connected that voltage impulses induced therein periodically charge the condenser, wherein the core of the transformer is such that it becomes magnetically saturated when the current in the primary winding is considerably less than the amplitude of the primary current so that sharp charging impulses are applied to the condenser as the primary current passes through zero, and wherein said element is so connected that its resistance is determined by the instantaneous value of the voltage across said secondary winding, said element periodically permitting the condenser to discharge therethrough and through the arc gap, such discharges occurring, in the case of alternating-current welding, in the neighbourhood of the instants at which the welding current passes through zero.

When the apparatus is employed in an alternating-current welding installation, a current impulse is supplied at the commencement of each half-cycle. The apparatus comprises no sensitive parts, such as thyratrons.

Figure 2:
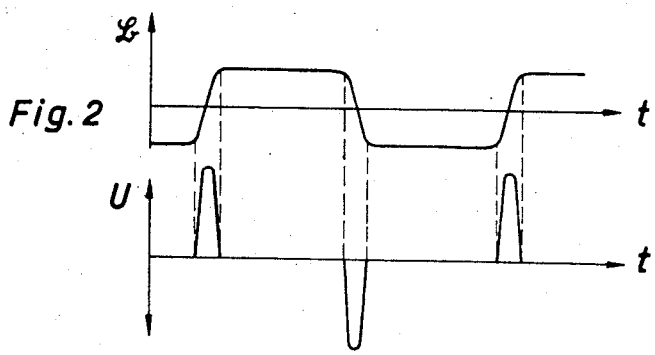
Figure 3:
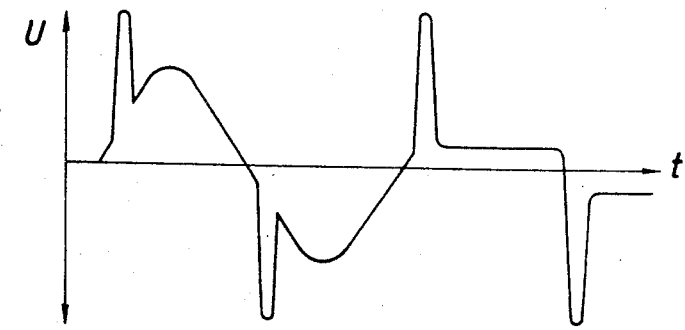

For a better understanding of the invention, and to show how the same may be carried into effect, reference will now be made to the accompanying drawing in which:

Figure 1 is a circuit diagram of apparatus for stabilising an alternating current welding arc, and Figures 2 and 3 show the variations with time of various parameters of the circuit shown in Figure 1.

Referring now to the drawing, the secondary winding 1 of a welding transformer supplies a welding circuit, shown in heavy lines, consisting of a choke 2, heavy current leads A and B, a welding electrode 3 and a grounded workpiece 4, the circuit being completed by the arc gap between the electrode 3 and the workpiece 4. An impulse transformer 6 is provided, the primary winding 6A thereof being connected in series with an inductor 7 and a resistor 8 across the leads A and B. The secondary winding 6B of the impulse transformer is also connected across the leads A and B, via an impulse condenser 9, of about $0.1/\mu f.$, and a resistance 11.

On the secondary side, the impulse transformer 6 charges the impulse condenser 9 to a maximum voltage which is limited by a voltage-dependent circuit element 10. The discharge impulse is passed through the damping resistance 11 to the welding circuit and from there into the arc gap 3, 4. All of the parts 6 to 11 are disposed in a grounded screen 5.

The impulse transformer 6 supplies a suddenly increasing and equally suddenly decreasing voltage peak of short duration and of alternate polarity on the secondary side each time the alternating current passes through zero in either direction, because the magnetic flux in the core varies only in these brief time intervals. Each current impulse always has the same direction as the momentary welding current. The flow of the welding current can thus be assisted at the commencement of each half-cycle. Since the impulse transformer is connected to welding voltage on the primary side, the form of the welding voltage at the beginning of each half-cycle affects the height of the voltage peak supplied on the secondary side. The welding voltage increases particularly steeply when the arc has been extinguished in the preceding half-cycle.

The voltage peak supplied by the impulse transformer is of particularly short duration and particularly sharp when the core consists of an iron alloy, the magnetic flux of which rises steeply with increasing magnetic field strength to a substantially constant saturation value. Such alloys, having high initial and maximum permeability and steeply decreasing saturation permeability and low hysteresis losses are known.

Since the impulse transformer is periodically exposed on the primary side 6A to a relatively high no-load voltage as well as to the welding voltage, the current-limiting resistor 8 is provided in the feed conductor to the primary winding of the impulse transformer. Alternatively, some other current-limiting means could be employed, for example a condenser or an inductive shunt across the primary winding 6A. The inductor 7 is provided in order to prevent the condenser 9, by which the current impulse is supplied from even partially discharging through the primary winding of the impulse transformer instead of through the arc path. The secondary winding of the welding transformer is also protected from discharge current impulses by the choke 2, whereby loss of some of the impulse energy in the stabilisation of the arc is at the same time prevented. The damping resistor 11 is provided in order to suppress as far as possible oscillations during discharge of the condenser. Oscillations such as are produced in high-frequency firing devices do not, then, occur.

The core of the impulse transformer 6 is so dimensioned that it is over-saturated even with welding voltages of about 10 volts, and even more so at the no-load voltage. If in addition the core consists of an iron alloy, the magnetic induction of which rises rapidly with increasing magnetic field strength to a substantially constant saturation value, the induction is a function of time, as illustrated in Figure 2. At each passage of the alternating current through zero, the magnetic induction suddenly changes, and a clearly pronounced voltage peak U of a few hundred volts and of short duration is induced in the secondary coil of the impulse transformer 6 only in these short intervals of time. The impulse condenser 9 stores the brief current impulse and yields it suddenly to the arc gap 3, 4 as soon as the boundary voltage of the voltage-dependent circuit element 10 is reached. This boundary voltage is smaller than the peak voltage supplied on the secondary side by the impulse transformer. The circuit element 10 preferably consists of a gas discharge tube having two electrodes, of a type known per se. The choice of the gas pressure and the nature of the gas is purely a matter of convenience. In order to prevent the sudden discharge from initiating an oscillation process, the resistance 11 of a few ohms damps the discharge process. Thus, the direction of the current impulse and the direction of the welding current will always be the same. Oscillations such as are produced in high-frequency firing devices therefore do not occur.

It will be seen from Figure 3 how the voltage impulse supplied by the impulse condenser 9 is superimposed on the no-load voltage (to the left in the figure) and the welding operation voltage (to the right in the figure) precisely when the voltage has passed through zero. Experience shows that despite the fact that the voltage peaks reach only a few hundred volts, the welding arc can be excellently stabilised. Substantially no high-frequency harmonics having high voltage amplitudes, which might interfere with radio reception, occur.

The choke 2 prevents the discharge impulse of the impulse transformer 9 from being balanced out through the secondary coil 1 of the welding transformer. The choke 7 performs the same function in the case of the impulse transformer 6. The ohmic resistance 8 or another current-limiting means prevents overloading of the primary coil of the impulse transformer, to which the no-load and welding voltage are alternately applied.

Naturally, the principles involved in the described circuit arrangement can also be successfully employed in direct-current welding. It is then connected to an alternating-current source and assists the ignition and the stability of the direct-current welding arc, by virtue of the fact that it supplies a voltage impulse in each half-cycle of the alternating current.

We claim:

1. A stabilizing circuit for use with a welding circuit having a voltage source coupled to welding electrodes via a choke, said stabilizing circuit comprising: a transformer including a primary winding coupled to said electrodes, a low saturation core operatively associated with said primary winding, and a secondary winding operatively associated with said coil; a storage device coupled between said primary and secondary windings for storing energy derived from said transformer; said secondary winding being coupled via said storage device to said electrodes; and a trigger device coupled in parallel with said secondary winding; a signal from said voltage source operating through said transformer by reason of said low saturation core to provide a sharp pulse of short duration which is stored by said condenser and fed to said electrodes under the control of said trigger device.

2. A stabilizing circuit as claimed in claim 1 wherein said primary winding is coupled to said welding circuit between the choke and one of said electrodes.

3. A stabilizing circuit as claimed in claim 1 wherein said core is of an iron alloy whereby said core readily reaches saturation.

4. A stabilizing circuit as claimed in claim 1 comprising a current limiting resistor in series with said primary winding.

5. A stabilizing circuit as claimed in claim 1 comprising a choke in series with said primary winding.

6. A stabilizing circuit as claimed in claim 1 comprising a damping impeder coupled to said trigger device.

7. A stabilizing circuit as claimed in claim 1 wherein said trigger device is a gas diode.

8. A stabilizing circuit as claimed in claim 1 wherein said storage device is a capacitor.

References Cited in the file of this patent

UNITED STATES PATENTS

| | | |
|---|---|---|
| 1,973,122 | Stoddard | Sept. 11, 1934 |
| 2,133,152 | Schigo | Oct. 11, 1938 |
| 2,151,786 | Marbury | Mar. 28, 1939 |
| 2,352,992 | Von Henke | July 4, 1944 |
| 2,516,016 | Pakala | July 18, 1950 |
| 2,561,995 | Roberts | July 24, 1951 |